United States Patent
Dowlatkhah et al.

(10) Patent No.: US 9,952,888 B2
(45) Date of Patent: *Apr. 24, 2018

(54) METHOD AND SYSTEM TO DYNAMICALLY INSTANTIATE VIRTUAL REPOSITORY FOR ANY SERVICES

(71) Applicant: AT&T Intellectual Property I, L.P., Atlanta, GA (US)

(72) Inventors: Sangar Dowlatkhah, Alpharetta, GA (US); Venson Shaw, Kirkland, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,277

(22) Filed: Jan. 10, 2017

(65) Prior Publication Data

US 2017/0123829 A1    May 4, 2017

Related U.S. Application Data

(63) Continuation of application No. 14/674,820, filed on Mar. 31, 2015, now Pat. No. 9,582,306.

(51) Int. Cl.
*G06F 9/54* (2006.01)
*G06F 9/455* (2018.01)
(Continued)

(52) U.S. Cl.
CPC ...... *G06F 9/45537* (2013.01); *G06F 9/44505* (2013.01); *G06F 9/45558* (2013.01);
(Continued)

(58) Field of Classification Search
CPC ............ G06F 9/45537; G06F 9/44505; G06F 9/45558; G06F 17/30575; G06F 2009/45562
See application file for complete search history.

(56) References Cited

U.S. PATENT DOCUMENTS 6,880,002 B2    4/2005    Hirschfeld et al.
7,890,689 B2    2/2011    Lam et al.
(Continued)

FOREIGN PATENT DOCUMENTS

WO    WO2013142426 A1    9/2013
WO    WO2014088542 A1    6/2014

OTHER PUBLICATIONS

Hassan Hawilo et al. "Next Generation Mobile Networks (vEPC)", IEEE Network • Nov./Dec. 2014, pp. 18-26.*
(Continued)

*Primary Examiner* — Brian W Wathen
*Assistant Examiner* — Abdou Seye

(57) ABSTRACT

A virtual machine/function of repository is used to collect information for use in providing a particular service to a particular user in a network. The virtual machine/function of repository is dynamically instantiating in a front end of the network upon receiving a request to provision the particular service for the particular user. The collected information pertains only to providing the particular service to the particular user. The virtual machine/function of repository is synchronized with one or more consolidated databases in a back end of the network. The virtual machine/function of repository is deleted upon discontinuation of the particular service for the particular user.

18 Claims, 2 Drawing Sheets

(51) Int. Cl.
  *G06F 9/445* (2018.01)
  *G06F 17/30* (2006.01)
(52) U.S. Cl.
  CPC .................. *G06F 17/30575* (2013.01); *G06F 2009/45562* (2013.01)

(56) References Cited

U.S. PATENT DOCUMENTS

| | | |
|---|---|---|
| 8,010,498 B2 | 8/2011 | Gounares et al. |
| 8,255,529 B2 | 8/2012 | Ferris et al. |
| 8,359,223 B2 | 1/2013 | Chi et al. |
| 8,543,642 B2 | 9/2013 | Corbett et al. |
| 8,549,515 B2 | 10/2013 | Bobroff et al. |
| 8,788,628 B1 | 7/2014 | Taylor et al. |
| 8,918,368 B2 | 12/2014 | Du et al. |
| 2010/0138830 A1 | 6/2010 | Astete et al. |
| 2010/0235467 A1 | 9/2010 | Dowlatkhah |
| 2010/0332456 A1 | 12/2010 | Prahlad et al. |
| 2011/0022642 A1 | 1/2011 | deMilo et al. |
| 2011/0138382 A1 | 6/2011 | Hauser et al. |
| 2011/0143782 A1* | 6/2011 | Dowlatkhah ........... H04W 4/00 455/456.5 |
| 2011/0145392 A1 | 6/2011 | Dawson et al. |
| 2012/0102291 A1 | 4/2012 | Cherian et al. |
| 2012/0166516 A1 | 6/2012 | Simmons et al. |
| 2012/0179874 A1 | 7/2012 | Chang et al. |
| 2012/0272242 A1 | 10/2012 | Jeon et al. |
| 2012/0290647 A1 | 11/2012 | Ellison et al. |
| 2013/0007744 A1 | 1/2013 | Arasaratnam |
| 2013/0179916 A1 | 7/2013 | Roberts et al. |
| 2014/0122387 A1 | 5/2014 | Chi et al. |
| 2014/0181301 A1 | 6/2014 | Yendluri |
| 2014/0229945 A1 | 8/2014 | Barkai |
| 2014/0278807 A1 | 9/2014 | Bahacek |
| 2015/0319078 A1 | 11/2015 | Lee |
| 2016/0103698 A1 | 4/2016 | Yang |
| 2016/0182684 A1 | 6/2016 | Connor |

OTHER PUBLICATIONS

"Chronos: Predictable Low Latency for Data Center Applications"; Rishi Kapoor, et al.; Proceedings of the Third ACM Symposium on Cloud Computing, ACM 2012.

"Relational Cloud: The Case for a Database Service"; Carlo Curino, et al.; New England Database Summit (2010).

"A Survey of Techniques Used to Reduce the Semantic Gap Between Database Management Systems and Storage Subsystems"; Biplob Kumar Debnath, et al.; Final Project Report 28; (2006).

"Building Repositories of Learning Objects in Specialized Domains: The Chasqui Approach"; Jose L. Sierra, et al.; Advanced Learning Technologies, 2005.; ICALT 2005, Fifth IEEE International Conference on IEEE, 2005.

"Enabling Secure and Efficient Ranked Keyword Search Over Outsourced Cloud Data"; Sri Lakshmi Cherukuri, et al.; IJRIT—International Journal of Research in Information Technology, vol. 2, Issue 1, Jan. 2014, pp. 121-130.

* cited by examiner

METHOD AND SYSTEM TO DYNAMICALLY INSTANTIATE VIRTUAL REPOSITORY FOR ANY SERVICES

CROSS-REFERENCE TO RELATED APPLICATIONS

This application is a continuation of application Ser. No. 14/674,820, entitled "Method and System to Dynamically Instantiate Virtual Repository for Any Services," filed on Mar. 31, 2015, Now U.S. Pat. No. 9,582,306 the contents of which are hereby incorporated by reference herein in their entirety.

TECHNICAL FIELD

The present disclosure relates to the virtualization of network services and functions. More specifically, the disclosure is directed to the creation of virtual domains per subscriber per service for accessing data repositories and databases.

BACKGROUND

As the entire digital/communication industry moves towards virtualization and creating services and network functions on virtual domains for each subscriber and for each specific service, the need for access to repositories and databases is paramount.

In today's advanced networks there are repositories for network functions, such as call processing and mid-call services, as well as repositories for customer profiles, billing and policy enforcement. Those also include service databases for any service provided to subscribers both internally and via third party services. For example, one mobile service provider maintains over ten platforms for services such as call completion, browsing, texting and third party services such as Twitter® and Facebook®. Currently those repositories exist as individual siloes across the network and must be queried for each subscriber and for each service that a subscriber is using. There are therefore millions of virtual service instances where there is a need for collecting, comparing and changing information with real time or near time access. In each of those instances, latency is created. To be able to accommodate all these inquiries, there is a tremendous need for platform access build-up as well as network backhaul expansion.

It can be seen that there is a need to reduce the latency created by collecting, comparing and changing information required in providing network services. There is furthermore a need to reduce the necessity for network backhaul infrastructure required for collecting, comparing and changing information required in providing network services.

SUMMARY

The needs existing in the field are addressed by the present disclosure, which relates to systems, methods and computer useable media for collecting information for use in providing a particular service to a particular user in a network. In embodiments, a method is provided, comprising receiving a request to provision the particular service for the particular user; dynamically instantiating a virtual machine/function of repository in a front end of the network, for representing the information for use only in providing the particular service to the particular user; synchronizing the virtual machine/function of repository with at least one consolidated database in a back end of the network; accessing the information from the virtual machine/function of repository as needed in providing the particular service to the particular user; receiving a request to discontinue the particular service for the particular user; and deleting the virtual machine/function of repository.

Each of the consolidated databases may contain information used in services having similar requirements. Communications between the virtual machine/function of repository and the at least one consolidated database may include dynamic security and policy functionality.

Communications between the virtual machine/function of repository and the consolidated database may include schema adaption functionality for correctly representing a data schema for the particular service. The virtual machine/function of repository may include at least one functionality for communications with at least one consolidated database, chosen from the group of functionalities consisting of alarm, indexing, backup, change log and certificate functionality.

Synchronizing the virtual machine/function of repository with the consolidated databases may further include writing, reading, changing or removing new information from at least one of the consolidated databases to the virtual machine/function of repository.

The respective objects and features of the disclosure may be applied jointly or severally in any combination or sub combination by those skilled in the art. Any claimed embodiment of the invention does not necessarily include all of the objects or embodiments of the disclosure.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EXEMPLARY EMBODIMENTS

The presently disclosed technique accommodates the current evolution of network topology by consolidating/federating existing repositories into a handful of datacenters, where databases with similar requirements can be consolidated/federated with main management functionality collected in the front part of the architecture. A virtual machine/function of repository is then created for each particular user for each particular service. The virtual machine/function of repository is synchronized with the consolidated/federated data center, and is deleted upon termination of the service. The virtual machine/function of repository contains only the information needed to offer the particular service to the particular user.

Currently there are numerous databases located across the network for a number of network functionalities and services. For each instance of a subscriber utilizing a service or placing a call there is a need to query the necessary databases. The databases are presently housed in vendor-specific hardware, but generic, unified hardware is being gradually implemented to run virtual, vendor-agnostic applications. Specifically, hardware implementing the X86 family of backward compatible instruction set architectures has been used. Since those databases are located in only a handful of data centers, with the cloud solution and nature of UDNC network, the number of virtual network functions will increase exponentially and the amount of traffic to hit those databases will also increase.

An example illustrates typical database usage by a user. The user powers up a mobile device and attaches to a mobile voice and data network. The mobile network accesses the Home Subscriber Server (HSS) and the Home Location Register (HLR) databases to authenticate and attach the user's device. If the user uses texting, the Multimedia Messaging Service (MIMS) database is accessed. Video streaming may require accessing one or more additional databases. The use of third party services such as Google®, Twitter® or Facebook®, which may require device capability data, preferred servers, user preferences, etc. that must be retrieved from additional databases. Further, the use of a single service may result in accessing multiple repositories.

In order to avoid that traffic increase and hardware augmentation in the database domain, the presently disclosed system consolidates the databases in the back end and dynamically creates front-end micro virtual machines for each instance. The virtual machines only include information needed for that particular service. Databases with similar requirements are consolidated/federated with a collected main management functionality.

Figure 1:
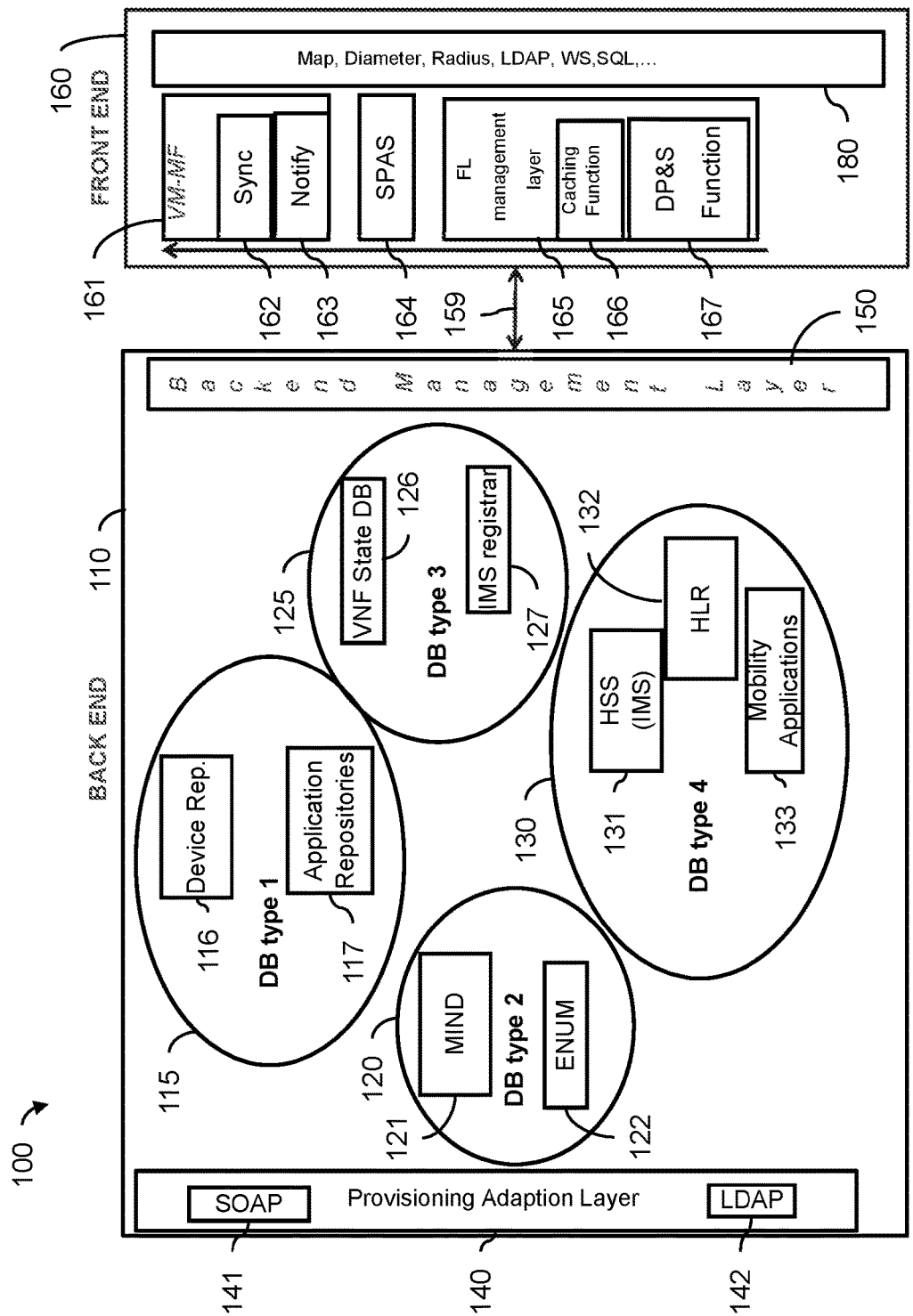
FIG. 1 is a block diagram showing a system architecture incorporating elements according to embodiments of the disclosure.

In the exemplary architecture 100 shown in FIG. 1, consolidated application repositories 115, 120, 125, 130 are created in a network backend 110. Each one of those repositories contains data supporting services having similar requirements. For example, repository 115 contains databases of a first type, including user device identification repositories 116 and application repositories 117, which have similar data management requirements. Similarly, repository 120 includes information from the MIND proprietary database 121, used in VOIP, and the ENUM (E.164 Number to URI Mapping) database 122 which translates telephone numbers into Internet addresses, both of which have similar data management requirements. Repository 125 includes information from the virtualized network function (VNF) state database 126 which is responsible for handling specific network functions that run in virtual machines, and information from the IMS (IP Multimedia Subsystem) registrar 127. Repository 130 includes information from the HSS (home subscriber server) (IMS) 131, the HLR (Home Location Register) 132, a central database that contains details of each mobile phone subscriber that is authorized to use the GSM® network, and mobility applications 129. In each case, the information contained in a single consolidated repository has similar data management requirements. For that reason, unified intelligence, including front end and security, may be used in each consolidated repository.

The consolidated databases 115, 120, 125, 130 are created and maintained via provisioning adaption layer 140 using the SOAP (Simple Object Access protocol) 141 XML-based protocol and/or LDAP (Lightweight Directory Access Protocol) 142. The consolidated databases may, for example, be Oracle® databases. A backend management layer 150 controls tasks pertinent to the consolidated databases 115, 120, 125, 130, such as backup, indexing, etc.

Upon the initiation of a service instance by or for a subscriber, a virtual machine/function of repository 161 is dynamically instantiated for that service where all the necessary information for the particular subscriber and the particular service is represented in a very small virtual repository. Virtual machine/function of repository 161 is created in a network front end 160. While only a single virtual machine/function of repository 161 is shown in the exemplary system 100 of FIG. 1, a large number of such VMs (one per user per service) is instantiated in an actual deployment of the disclosed system.

The VM-MF contains support for synchronization 162 of the virtual machine/function of repository 161 with the consolidated repositories in both directions, as represented by arrow 159. That is, read, write, change and delete capabilities are provided from the virtual machine/function of repository 161 to the consolidated repositories 115, 120, 125, 130 and from the consolidated repositories to the virtual machine. More generally, each single logical operation on the data is guaranteed atomicity, consistency, isolation, and durability. That set of properties guarantees that the database transactions are processed reliably.

The VM-MF additionally supports a notify function 163 supporting notifications in both directions to provide alerts, for example, for changes to or accesses to the data.

A smart profile adaption engine with dynamic selection feature (SPAS) 164 is capable of handling various data schemas in adapting the virtual machine/function of repository 161 for particular services. That schema adaption functionality enables the virtual machine/function of repository to correctly represent the data schema for each particular service.

A front line management layer 165 provides front line management for database transactions. The front line management layer 165 includes a caching function 166 as well as a dynamic policy and security (DP&S) function 167 that provide support for transmitting information from the virtual machine/function of repository to be used in providing the particular service to the particular user. For example, the front line management layer may oversee the transfer of data to and from a user mobile device or a service provider server.

Various interface protocols 180 may be used in making the stored information available for use in the particular service. Examples include the Mobile Application Part (MAP) SS7 protocol, RADIUS and DIAMETER authentication, authorization, and accounting protocols, WebSocket (WS) protocol and Structured Query Language (SQL).

A virtual machine/function of repository 161 may be created for any of a large variety of telecommunications or other data services. In one example, information required for running one or more mobility applications for a particular subscriber are made available via a virtual machine/function of repository. The information may include, for example, user preferences, user device identification information and stored application data. The virtual machine/function of repository 161 is created by a service controller upon notice that a user is utilizing a mobile application.

In another example, a Trusted WLAN AAA Proxy (TWAP) service or a Trusted Wireless Access Gateway (TWAG) may access required information via a virtual machine/function of repository created upon a request by a user to join a WiFi network.

Mobility Management Entity (MME) and Mobile Switching Center (MSC) systems may access required information via a virtual machine/function of repository for wireless communications activities. Policy tools for determining policy rules in a network, such as Policy and Charging Rules Function (PCRF) and Resource Access Control Facility (RACF) may also access needed information for specific users and services via a virtual machine/function of repository.

Figure 2:
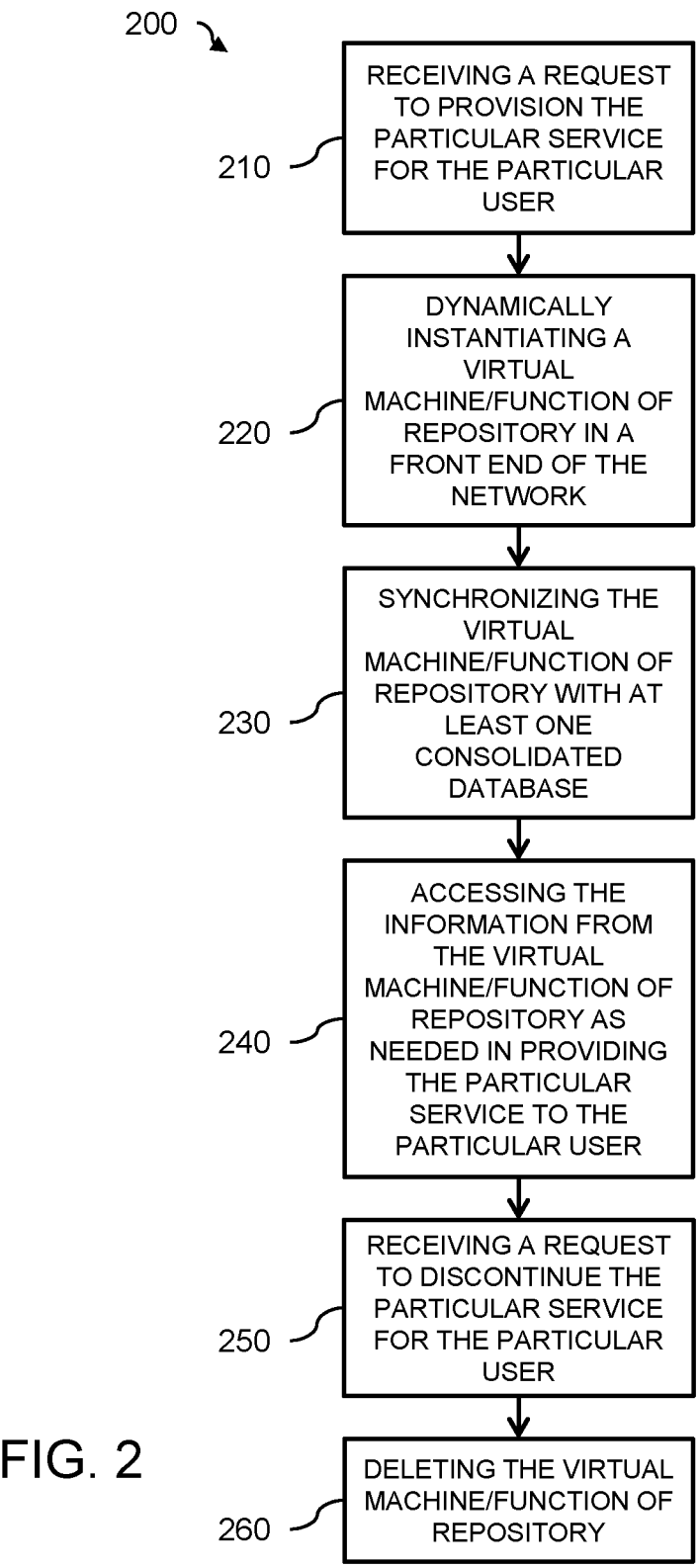
FIG. 2 is a flow chart showing a method in accordance with one embodiment the disclosure.

An exemplary method in accordance with embodiments of the present disclosure is illustrated by the flow chart 200 of FIG. 2. A request to provision the particular service for the particular user is received at block 210. In embodiments, the request is received at a service controller within a dynamic service platform. The request may be a message generated in response to a user turning on her mobile device, joining a WiFi network, activating a social network, activating a new device or any other activity requiring information from the network. The request may alternatively be generated in response to an activity that was not initiated by a user, such as a billing activity, software updates, etc.

In response to receiving the request to provision the particular service for the particular user, a virtual machine/function of repository is dynamically instantiated at block 220 in a front end of the network, for representing the information for use only in providing the particular service to the particular user. The virtual machine/function of repository may be created by hypervisor middleware that is part of the disclosed dynamic service platform. The virtual machine/function of repository contains information needed for instantiating and providing the particular service to the particular user, but does not contain information relating to other services or other users.

The virtual machine/function of repository is synchronized at block 230 with at least one of the consolidated databases in a back end of the network. The synchronization may take place on a time-based schedule or as needed for the life of the virtual machine/function of repository. Communication between the virtual machine/function of repository and the consolidated databases implements dynamic security and policy functionality as well as a schema adaption function. The synchronization is in both directions with read, write, change and delete capability. As noted above, the consolidated or federated databases are back end virtual repositories, each repository containing information relating to a group of services having similar or related data requirements, and each repository containing information relating to a plurality of users/subscribers.

The information from the virtual machine/function of repository is accessed as needed at block 240 in providing the particular service to the particular user. Interface protocols such as MAP, RADIUS, DIAMETER, LDAP, WS and SQL may be used in communications between the virtual machine/function of repository and the services supported by the virtual repository.

The virtual machine/function of repository is deleted (block 260) after receiving a request (block 250) to discontinue the particular service for the particular user. In that way, the virtual machine is available for use in providing another service to another user. The creation and deletion of the virtual machine/function of repository on an "as needed" basis reduces infrastructure and network elements required in implementing the presently disclosed architecture.

The system discussed above comprises software running on one or more processors, together with input/output capability and computer readable media having computer readable instructions stored thereon that, when executed by the processors, cause the processors to perform various operations. The processors may be dedicated processors, or may be mainframe computers, desktop or laptop computers or any other device or group of devices capable of processing data. The processors are configured using software according to the present disclosure.

The system also includes memory that functions as a data memory that stores data used during execution of programs in the processors, and is also used as a program work area.

The memory may also function as a program memory for storing a program executed in the processors. The program may reside on any tangible, non-volatile computer-readable media as computer readable instructions stored thereon for execution by the processor to perform the operations.

Generally, the processors are configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable medium such as a ROM or other type of hard magnetic drive, optical storage, tape or flash memory. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude transitory signals such as propagated signals, which are not tangible and are not non-transitory. Cached information is considered to be stored on a computer-readable medium. Common expedients of computer-readable media are well-known in the art and need not be described in detail here.

CONCLUSION

With the above-described solution in place, when a service controller initiates a service instance for a subscriber, a virtual machine/function of repository is dynamically instantiated for that service where all the necessary information for the subscriber and the particular service are represented in a very small virtual machine/function of repository. This VM synchronizes directly with the appropriate consolidated repository in both directions with read, write, change and delete capability. Once the service is completed, the VM is deleted and ready for the next service.

The communication between the VM and main virtual repository platform has all the necessary functionality such as dynamic security and policy functionality and schema adaption functionality to accommodate for new service database and functionalities needed.

Utilizing existing elements in the network, a dynamic service platform is created where any tailored service can be created on demand dynamically within a short time frame. Data traffic to a network operator's internal repository is expected to be reduced by 30%-40%. The technique eliminates multiple instances of the same repository across the network. The amount of capital expenditure and operating expense is reduced significantly by virtualization of the entire repository platform with virtual machines running on off-the-shelf hardware.

Service deployment and network augmentation can be done more efficiently since the repository data can be reached immediately by utilizing on-demand repository virtual machines. Unnecessary traffic increase and hardware augmentation is avoided in the database domain.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A method for providing information for use in a particular network service to a particular user in a network, comprising:
creating a plurality of consolidated application repositories in a network backend, including a first consolidated application repository containing information used in a plurality of network services having similar requirements, the information relating to a plurality of users; and
synchronizing the first consolidated application repository with a virtual machine/function of repository in a front end of the network, the virtual machine/function of repository being dynamically instantiated upon a request to provision an instance of a particular service for a particular user and being accessible for providing the particular service to the particular user, wherein the synchronizing includes synchronizing information for use only in providing a particular service to a particular user, and does not include synchronizing information for providing services other than the instance of the particular service and does not include synchronizing information for providing services to users other than the particular user;
wherein the virtual machine/function of repository is deleted upon receiving a request to discontinue the particular service for the particular user.

2. The method of claim 1, wherein synchronizing the first consolidated application repository with the virtual machine/function of repository further comprises providing dynamic security and policy functionality.

3. The method of claim 1, wherein synchronizing the first consolidated application repository with the virtual machine/function of repository further comprises providing schema adaption functionality for correctly representing a data schema for the particular service.

4. The method of claim 1, wherein synchronizing the first consolidated application repository with the virtual machine/function of repository further comprises providing at least one functionality chosen from the group of functionalities consisting of alarm, indexing, backup, change log and certificate functionality.

5. The method of claim 1, wherein synchronizing the first consolidated application repository with the virtual machine/function of repository further comprises writing new information from the virtual machine/function of repository to the first consolidated application repository.

6. The method of claim 1, wherein synchronizing the first consolidated application repository with the virtual machine/function of repository further comprises reading new information from the first consolidated application repository for recording in the virtual machine/function of repository.

7. A tangible computer-usable medium having computer readable instructions stored thereon that, when executed by a processor, cause the processor to perform operations for providing information for use in a particular network service to a particular user in a network, the operations comprising:
creating a plurality of consolidated application repositories in a network backend, including a first consolidated application repository containing information used in a plurality of network services having similar requirements, the information relating to a plurality of users; and
synchronizing the first consolidated application repository with a virtual machine/function of repository in a front end of the network, the virtual machine/function of repository being dynamically instantiated upon a request to provision an instance of a particular service for a particular user and being accessible for providing the particular service to the particular user, wherein both the virtual machine/function of repository and the first consolidated application repository are synchronized and the synchronizing includes synchronizing information for use only in providing a particular service to a particular user, and does not include synchronizing information for providing services other than the instance of the particular service and does not include synchronizing information for providing services to users other than the particular user;
wherein the virtual machine/function of repository is deleted upon receiving a request to discontinue the particular service for the particular user.

8. The tangible computer-usable medium of claim 7, wherein synchronizing the first consolidated application repository with the virtual machine/function of repository further comprises providing dynamic security and policy functionality.

9. The tangible computer-usable medium of claim 7, wherein synchronizing the first consolidated application repository with the virtual machine/function of repository further comprises providing schema adaption functionality for correctly representing a data schema for the particular service.

10. The tangible computer-usable medium of claim 7, wherein synchronizing the first consolidated application repository with the virtual machine/function of repository further comprises providing at least one functionality chosen from the group of functionalities consisting of alarm, indexing, backup, change log and certificate functionality.

11. The tangible computer-usable medium of claim 7, wherein synchronizing the first consolidated application repository with the virtual machine/function of repository further comprises writing new information from the virtual machine/function of repository to the first consolidated application repository.

12. The tangible computer-usable medium of claim 7, wherein synchronizing the first consolidated application repository with the virtual machine/function of repository further comprises reading new information from the first consolidated application repository for recording in the virtual machine/function of repository.

13. A network backend, comprising:
a processor;
a computer useable medium connected to the processor and containing computer readable instructions stored thereon that, when executed by the processor, cause the processor to perform operations for providing information for use in a particular network service to a particular user in a network, the operations comprising:
creating a plurality of consolidated application repositories in a network backend, including a first consolidated application repository containing information used in a plurality of network services having similar requirements, the information relating to a plurality of users; and
synchronizing the first consolidated application repository with a virtual machine/function of repository in a front end of the network, the virtual machine/function of repository being dynamically instantiated upon a request to provision an instance of a particular service for a particular user and being accessible for providing the particular service to the particular user, wherein the synchronizing includes synchronizing information for use only in providing a particular service to a particular user, and does not include synchronizing information for providing services other than the instance of the particular service and does not include synchronizing information for providing services to users other than the particular user, wherein the virtual machine/function of repository is deleted upon receiving a request to discontinue the particular service for the particular user.

14. The network backend of claim 13, wherein synchronizing the first consolidated application repository with the virtual machine/function of repository further comprises providing dynamic security and policy functionality.

15. The network backend of claim 13, wherein synchronizing the first consolidated application repository with the virtual machine/function of repository further comprises providing schema adaption functionality for correctly representing a data schema for the particular service.

16. The network backend of claim 13, wherein synchronizing the first consolidated application repository with the virtual machine/function of repository further comprises providing at least one functionality chosen from the group of functionalities consisting of alarm, indexing, backup, change log and certificate functionality.

17. The network backend of claim 13, wherein synchronizing the first consolidated application repository with the virtual machine/function of repository further comprises writing new information from the virtual machine/function of repository to the first consolidated application repository.

18. The network backend of claim 13, wherein synchronizing the first consolidated application repository with the virtual machine/function of repository further comprises reading new information from the first consolidated application repository for recording in the virtual machine/function of repository.

* * * * *